June 8, 1965  H. E. MILLER  3,188,152
CUSHIONED BEARING ASSEMBLY
Filed Jan. 4, 1962  2 Sheets-Sheet 1

INVENTOR
*Harvey E. Miller*

BY *McCoy, Greene & LeBlancLewis*
ATTORNEYS

June 8, 1965　　　　H. E. MILLER　　　　3,188,152
CUSHIONED BEARING ASSEMBLY
Filed Jan. 4, 1962　　　　　　　　　　　　2 Sheets-Sheet 2

INVENTOR
*Harvey E. Miller*

BY *McCoy, Greene & Te Grotenhuis*
ATTORNEYS

3,188,152
CUSHIONED BEARING ASSEMBLY
Harvey E. Miller, Logansport, Ind., assignor to The General Tire & Rubber Company, Akron, Ohio, a corporation of Ohio
Filed Jan. 4, 1962, Ser. No. 164,361
7 Claims. (Cl. 308—36.1)

This invention relates to bearing assemblies suitable for use between relatively rotating or oscillating parts and of the type in which a tubular insert of elastic rubber is confined between a rigid bearing sleeve and a second rigid sleeve coaxial therewith and which provides a cushioned support for the bearing to absorb impacts and vibration and to compensate for misalinement of a shaft or pivot with which it is used.

The present invention provides a bearing assembly suitable for use in various types of pivotal connections between members having relatively oscillating movements or as a support for a rotating member that includes a tubular elastic rubber cushioning element and that is designed to protect the rubber cushioning element against torsional stresses which would tend to cause circumferential slip between the rubber and the sleeves between which it is confined. The rubber insert is preferably held under radial compression between the inner and outer rigid sleeves, one of which is a bearing sleeve provided with a low friction bearing face formed to retain a lubricant. The low friction material of the bearing is preferably a resilient plastic material such as nylon, polytetrafluoroethylene such as sold under the trade name "Teflon" or a linear acetal consisting of unbridged polyoxymethylene chains of great length such as sold under the trade name "Delrin."

One of the coaxial sleeves between which the rubber insert is retained in the assembly of the present invention is preferably a two part sleeve composed of two relatively rotatable cylindrical parts, one fitting within the other for relative turning movements, the two part sleeve being so constructed that it can be quickly and easily assembled with the rubber insert and the coaxial rigid sleeve.

Reference should be had to the accompanying drawings forming part of this specification, in which.

Figure 1:
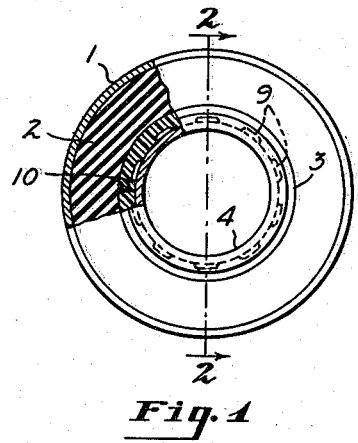
FIGURE 1 is an end elevation of an assembly embodying the invention with a portion broken away and shown in section.
Figure 2:
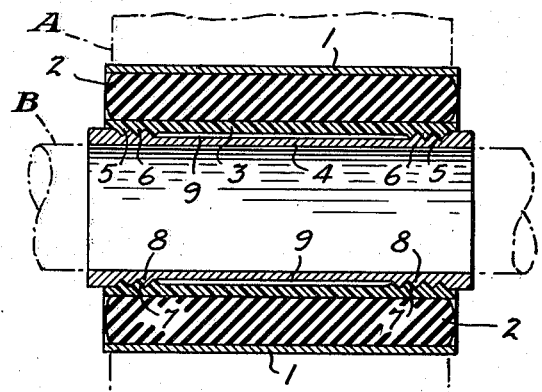
FIG. 2 is a longitudinal section taken on the line indicated at 2—2 in FIG. 1.

FIGURES 1 and 2 of the drawings show a bearing assembly that is interposed between an outer supporting member A and an inner shaft or piovt B. The assembly comprises an outer rigid sleeve 1 which may be formed of metal, a tubular elastic rubber insert 2 that is received within the outer sleeve 1 and which is interposed between the outer sleeve 1 and an inner bearing sleeve which consists of an outer substantially cylindrical part 3 and an inner substantially cylindrical part 4 which fits within the part 3 and which is rotatable within the part 3. The outer cylindrical part 3 of the bearing sleeve is formed of a material which has a low coefficient of friction, preferably a resilient plastic material such as nylon, Teflon or Delrin. The interior face of the cylindrical part 3 of the bearing sleeve is provided adjacent each end with parallel endless circular circumferential grooves 5 which form circumferential ribs 6 between them and the inner cylindrical part 4 of the bearing sleeve is provided adjacent each end with parallel grooves 7 in which the ribs 6 of the outer cylindrical part 3 fit and the grooves 7 form between them ribs 8 which fit in the grooves 5 of the cylindrical part 3. Between the grooved end thereof the outer cylindrical part 3 is provided with longitudinal grooves 9 which may be filled with a suitable lubricant.

The interfitting ribs and grooves of the cylindrical parts 3 and 4 form seals to prevent escape of lubricant from the bearing. The inner cylindrical member 4 may be free to turn with respect to the shaft or pivot pin B, in which case the outer portion of the assembly will turn with respect to the inner part 4 of the bearing sleeve only when the friction between the bearing member 4 and the shaft is sufficient to cause turning movement of the inner part 4 of the bearing sleeve with respect to the outer part 4. In some instances it may be desirable to have the inner part 4 connected to the shaft or pin to turn therewith, in which case the relative turning movement would be entirely between the cylindrical parts 3 and 4.

The elastic rubber insert 2 is preferably retained under radial compression between the outer rigid sleeve 1 and the inner two-part bearing sleeve composed of the cylindrical parts 3 and 4. In order to enable the rubber insert to be conveniently assembled between the outer cylindrical sleeve and the inner bearing sleeve, the parts 3 and 4 are preferably assembled prior to the insertion of the bearing sleeve into the tubular rubber insert and, in order to permit the assembly of the parts 3 and 4, the outer plastic part 3 is provided with a longitudinal slit 10 extending throughout the length thereof to permit the cylindrical member 3 to be expanded sufficiently to enable it to be positioned around the inner circumferentially continuous part 4 prior to assembly with the outer sleeve 1 and rubber insert 2. The bearing assembly is designed to be capable of convenient assembly by methods now in common use such as disclosed in the patent to Beck 2,660,780, granted Dec. 1, 1953. The rubber insert 2 may be contracted and forced into the sleeve 1 by forcing it through a funnel-shaped guide which has its small delivery end registered with one end of the sleeve 1. After assembly of the insert with the sleeve 1, the inner two-part bearing sleeve can be forced into the rubber insert 2 behind a suitable tapered pilot or other expanding means which expands the opening of the tubular insert 2 to a diameter to receive the bearing sleeve.

Figure 3:
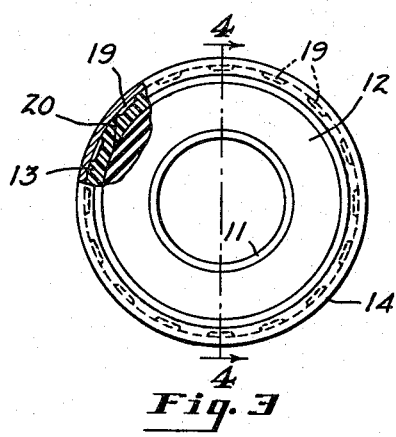
FIG. 3 is an end elevation of another assembly embodying the invention with a portion broken away and shown in section.
Figure 4:
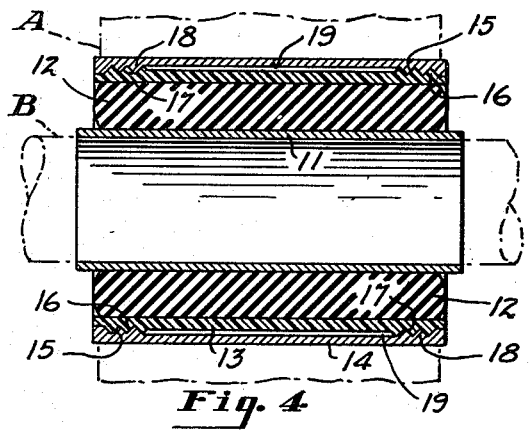
FIG. 4 is a longitudinal section taken on the line indicated at 4—4 in FIG. 3.

FIGURES 3 and 4 of the drawings show a structure which differs from the structure shown in FIGS. 1 and 2 only in that the two-part bearing sleeve is disposed exteriorly of the tubular elastic rubber insert instead of interiorly thereof. In this modification a circumferentially continuous cylindrical metal sleeve 11 is disposed interiorly of a tubular elastic rubber insert 12 a two-part bearing sleeve consisting of an inner sleeve-like cylindrical part 13 composed of a material having a low coefficient of friction and an outer circumferentially continuous cylindrical part 14 which may be made of metal and which is rotatable with respect to the part 13. The part 13, which is preferably a resilient plastic material, is provided adjacent each end with parallel endless circular circumferential grooves 15 which form circumferential ribs 16 between them and the outer cylindrical part 14, is provided adjacent each of its ends with parallel grooves 17 which form ribs 18 between them. The ribs 16 of the inner cylindrical part 13 fit in the grooves 17 of the outer cylindrical part 14 to provide a seal at each end of the bearing which prevents escape of lubricant and the plastic cylindrical part 13 is provided with longitudinal grooves 19 in its exterior face which extend throughout the space between the end grooves 15.

In order to permit assembly of the parts 13 and 14 of the bearing sleeve, the inner part 13 which is composed of a resilient low friction material such as nylon, Teflon or Delrin, is provided with a longitudinal slit 20 which will permit one of the abutting edges to be moved radially and circumferentially with respect to the other so that the cylindrical part 13 can be contracted to an external diameter small enough to permit it to be moved into the outer cylindrical part 14 and then expanded into engagement with the interior thereof. After the two-part bearing sleeve is assembled, the bearing sleeve, together with the inner sleeve 11, can be assembled with the tubular elastic rubber insert 12 in the manner described in connection with FIGS. 1 and 2.

Figure 5:
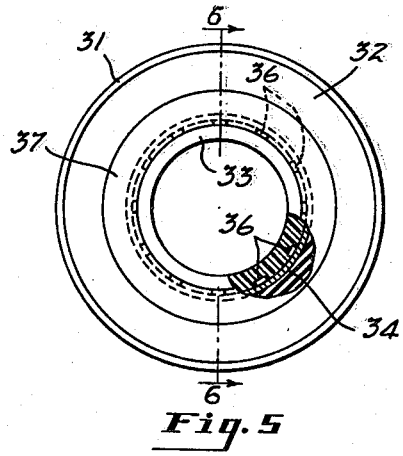
FIG. 5 is an end elevation of a modified assembly with a portion broken away and shown in section.
Figure 6:
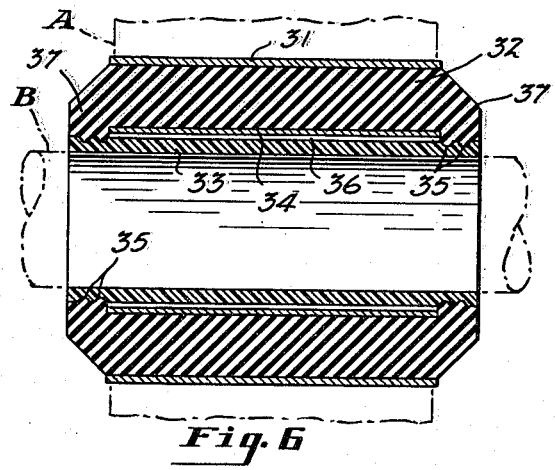
FIG. 6 is a section taken on the line indicated at 6—6 in FIG. 5.

In FIGS. 5 and 6 a further modification of the invention is shown in which the assembly is provided with an outer rigid sleeve 31 which may be formed of metal and a tubular ruber insert 32 that is received within the sleeve 31. The tubular rubber insert 32 is retained under radial compression between the outer sleeve 31 and an inner two-part bearing sleeve which consists of an interior cylindrical bearing part 33 which is composed of a material having a low coefficient of friction, preferably a low friction plastic material, and an outer cylindrical part 34 which fits upon the exterior of the inner cylindrical part 33 and which is rotatable with respect to the inner part 33. The elastic rubber insert 32 is somewhat longer than the outer sleeve 31 and the outer part 34 of the inner bearing sleeve. The inner part 33 of the bearing sleeve is longer than the outer cylindrical part 34 and projects beyond the ends thereof. In the portions of the inner cylindrical part 33 projecting beyond the outer cylindrical part 34 external endless circular circumferential grooves 35 are provided and between the grooves 35 the part 33 is provided with longitudinal external grooves 36 which may be filled with a suitable lubricant. The rubber insert 32 has portions 37 that project beyond the ends of the cylindrical outer part 34 of the bearing sleeve and engage the grooved ends of the inner cylindrical part 33 to provide a seal to prevent escape of lubricant from the grooves 36.

The two-part bearing sleeve composed of the inner and outer parts 33 and 34 may be inserted as a unit within the rubber insert 32 or the inner part 33 may be inserted after the rubber insert has been assembled between the outer sleeve 31 and the outer part 34 of the bearing sleeve. The rubbber insert 32 prior to its assembly with the outer and inner sleeves, is of an internal diameter less than the external diameter of the outer part 34 of the bearing sleeve so that after assembly the ends 37 of the elastic insert 37 will press radially against the projecting portions of the exterior face of the inner bearing part 33. The sleeve parts 33 and 34 may both be circumferentially continuous and the projecting portions 37 of the rubber insert 32 serve not only to provide a seal against the escape of lubricant, but also serve to restrain the inner part 33 of the bearing sleeve against longitudinal movement with respect to the outer part 34 thereof.

It is to be understood that in accordance with the provisions of the patent statutes, variations and modifications of the specific devices herein shown and described may be made without departing from the spirit of the invention.

What I claim is:

1. A cushioned bearing assembly comprising coaxial rigid sleeves disposed one within the other and a tubular insert of elastic rubber retained under radial compression between said sleeves, one of said sleeves having a bearing face composed of a low friction material, and that is provided with longitudinally extending lubricant receiving grooves, said last mentioned sleeve comprising two substantially cylindrical parts, one fitting within the other and rotatable with respect to the other, one of said parts being a circumferentially continuous bearing member and the other of said parts being interposed between the said continuous bearing member and said rubber insert, and means for restraining relative axial movement of said cylindrical parts, said circumferentially continuous bearing member being longer than the other relatively rotatable sleeve part and projecting beyond the ends thereof, said elastic rubber insert projecting beyond the ends of the shorter sleeve part and engaging with the bearing face of the longer sleeve part beyond the ends of said shorter sleeve part to provide therewith sealing means for retarding escape of lubricant from the bearing.

2. A cushioned bearing assembly comprising coaxial rigid sleeves disposed one within the other and a tubular insert of elastic rubber retained under radial compression between said sleeves, one of said sleeves comprising two interfitting relatively rotatable cylindrical members, one of which is composed of low friction material, one of said members being a circumferentially continuous bearing member having bearing face and the other of said members being disposed between said circumferentially continuous bearing member and said rubber insert and having a bearing face engaging the bearing face of said continuous bearing member, said other rigid sleeve, said other cylindrical member and said rubber insert forming a unit rotatable with respect to said continuous bearing member, one of the two engaging bearing faces having longitudinal grooves for retaining lubricant between said faces, and means beyond the ends of said grooves for retarding the escape of lubricant from between said engaging bearing faces and for restraining relative axial movements of said unit and said circumferentially continuous bearing members.

3. A cushioned bearing assembly as set forth in claim 2 in which the means for retarding escape of lubricant and restricting relative axial movements comprises parallel circular ribs and grooves in the bearing face of the circumferentially continuous bearing member and portions of said unit that engage therewith.

4. A cushioned bearing assembly as set forth in claim 2 in which the means for retarding escape of lubricant and for restraining relative axial movements comprises interfitting parallel circular ribs and grooves in the bearing faces of the cylindrical members.

5. A cushioned bearing assembly as set forth in claim 2 in which the circumferentially continuous bearing member is composed of low friction resilient plastic material.

6. A cushioned bearing assembly as set forth in claim 2 in which the cylindrical member of low friction material has a bearing face provided with longitudinal lubricant retaining grooves terminating inwardly of its ends, and circumferential grooves adjacent its ends and beyond the ends of said longitudinal grooves.

7. A cushioned bushing assembly as set forth in claim 1 in which the longer sleeve part has longitudinal lubricant receiving grooves in the face thereof that engages with the shorter sleeve part and that terminate adjacent the ends of the shorter sleeve.

References Cited by the Examiner

UNITED STATES PATENTS

| 2,815,253 | 12/57 | Spriggs | 308—238 |
| 2,839,340 | 6/58 | Merchant | 308—26 |
| 3,009,746 | 11/61 | Haushalter | 308—26 |
| 3,070,378 | 12/62 | Bajoke et al. | 277—95 |

FOREIGN PATENTS

| 805,539 | 12/58 | Great Britain. |
| 828,065 | 2/60 | Great Britain. |
| 847,171 | 9/60 | Great Britain. |

FRANK SUSKO, *Primary Examiner.*